United States Patent
Osterday et al.

[11] Patent Number: 5,878,650
[45] Date of Patent: Mar. 9, 1999

[54] POWER BOOSTER SEALING MECHANISM

[75] Inventors: Craig Alan Osterday, Dayton; Timothy Allen Haerr, Enon; William Lee Van Doren, Dayton, all of Ohio; Philippe Castel; Joseph Genaudeau, both of Paris, France

[73] Assignees: General Motors Corporation, Detroit, Mich.; Delphi France Automotive Systems, La Garenne-Colombes, France

[21] Appl. No.: 859,932

[22] Filed: May 21, 1997

[51] Int. Cl.$^6$ ..................................................... F01B 19/00
[52] U.S. Cl. .............................................. 92/48; 92/169.3
[58] Field of Search .............................. 91/376 R; 92/48, 92/49, 169.2, 169.3, 169.4

[56] References Cited

U.S. PATENT DOCUMENTS

| | | | |
|---|---|---|---|
| 3,388,635 | 6/1968 | Hagar ........................................... | 92/48 |
| 4,256,016 | 3/1981 | Thomas ............................... | 92/169.2 R |
| 4,270,438 | 6/1981 | Thomas et al. . | |
| 4,271,750 | 6/1981 | Thomas et al. . | |
| 4,325,218 | 4/1982 | Weiler et al. . | |
| 4,330,996 | 5/1982 | Becht et al. ................................. | 92/48 |
| 4,339,921 | 7/1982 | Schanz . | |
| 4,377,966 | 3/1983 | Parker et al. . | |
| 4,416,191 | 11/1983 | Takeuchi et al. . | |
| 4,418,613 | 12/1983 | Weiler et al. . | |
| 4,433,614 | 2/1984 | Takeuchi et al. . | |
| 4,522,108 | 6/1985 | Takeuchi et al. . | |
| 4,526,089 | 7/1985 | Takeuchi . | |
| 4,542,680 | 9/1985 | Takeuchi . | |
| 4,557,179 | 12/1985 | Takeuchi et al. . | |
| 4,594,854 | 6/1986 | Takeuchi et al. . | |
| 4,617,858 | 10/1986 | Hachiro . | |
| 4,944,214 | 7/1990 | Briggs . | |
| 5,056,413 | 10/1991 | Kaub . | |
| 5,072,996 | 12/1991 | Heibel et al. . | |

FOREIGN PATENT DOCUMENTS

| | | | |
|---|---|---|---|
| 0009393-B1 | 7/1982 | European Pat. Off. . | |
| 0327997-B1 | 6/1993 | European Pat. Off. . | |
| 0573233-A1 | 12/1993 | European Pat. Off. . | |
| 114151 | 7/1984 | Japan ................................... | 91/376 R |
| 120559 | 7/1984 | Japan ................................... | 91/376 R |
| 2009871 | 4/1982 | United Kingdom . | |

Primary Examiner—F. Daniel Lopez
Attorney, Agent, or Firm—Jeffrey A. Sedlar

[57] ABSTRACT

A power booster includes a housing with a rear housing section and a front housing section defining an internal cavity. A housing wall separates the internal cavity into a first chamber and a second chamber with an opening formed in the housing wall, wherein it is desirable to extend a component through the opening. A tube has an end secured in the opening in the housing wall. The tube's end includes a radially directed wall extending from the end of the tube that extends to an axially extending wall positioned concentrically with the tube and terminating with an outwardly turned segment. The axially extending wall is positioned within the opening in the housing wall with a seal positioned between the axially extending wall and the housing wall wherein the distance between the front housing section and the rear housing section is minimized, by extending the component through the tube.

16 Claims, 3 Drawing Sheets

POWER BOOSTER SEALING MECHANISM

TECHNICAL FIELD

The invention relates to a power booster sealing mechanism. More particularly, the present invention relates to a power booster with a sealing mechanism for surrounding a component that extends through the power booster and penetrates an internal wall.

BACKGROUND OF THE INVENTION

Power boosters operating on a pressure differential, such as exists between the engine intake manifold of a vehicle and the atmosphere, are well known devices. Typically, a shell-like housing encloses at least one variable pressure chamber that is separated from a vacuum chamber by a diaphragm and its supporting wall. The diaphragm and supporting wall are axially moveable relative to the housing under variable pressure conditions. Often, the housing's interior is subdivided by a housing divider wall separating a secondary variable pressure and vacuum chamber combination from the primary chamber pair. A power piston is urged to move axially by the diaphragm(s) and actuates an output rod for operating the vehicle brakes through an engaged master cylinder.

It has long been known that the weight of a power booster can be reduced by using thin-wall or lightweight material for the housing walls. When this is done, some additional structural support is obviously needed to maintain the structural integrity of the housing. One manner of providing the additional structural support is to extend a shaft or shafts through the housing to carry the generated loads, freeing the housing shell from this function. When axial forces are generated in the power booster, the shaft(s) hold the relative positions of the front and rear housing walls.

One significant problem that arises when extending a shaft through the erstwhile hermetic chambers of a power booster, resides in a need to provide a secure, movable seal assembly where the shaft passes through the structure. This is complicated by the often desirable condition that the overall length of the power booster must be minimized. Accordingly, the sealing structure preferably avoids adding to booster length while concurrently providing an effective seal between relatively movable components. In the case of a tandem diaphragm vacuum power booster, the minimum theoretical length is equal to twice the space needed for the diaphragm and support wall travel distance, plus the thickness of the external housing walls, plus the divider wall thickness, plus the tolerances. In practice, approaching the minimum possible length has been difficult. Generally, the sealing mechanism undesirably adds to the booster length and may be difficult to assemble and expensive to produce. Accordingly, a new power booster sealing mechanism is needed.

SUMMARY OF THE INVENTION

An aspect of the present invention resides in providing an improved sealing mechanism for power boosters, wherein the necessity of passing a component through the diaphragm(s) arises. A power booster directed at achieving this aspect includes a housing with a rear housing section and a front housing section that together, define an internal cavity. An internal housing wall separates the internal cavity into a first area and a second area with an opening formed in the internal housing wall, wherein it is desirable to extend a component through the opening. A tube has an end secured in the opening in the internal housing wall wherein the end includes a radially directed wall. The radially directed wall extends to an axially extending wall positioned concentrically with the tube's cylindrical body. The axially extending wall is positioned within the opening in the housing wall with a seal positioned between the axially extending wall and the housing wall. The distance between the front housing section and the rear housing section is advantageously minimized, with the component extending through the tube.

According to preferred and optional aspects of the present invention, a power booster is provided in a twin diaphragm arrangement. A housing divider wall separates the internal cavity into primary and secondary chambers, with an opening formed in the housing divider wall. The primary chamber includes a first vacuum compartment and a first variable pressure compartment wherein the first vacuum compartment and the first variable pressure compartment are separated by a first diaphragm. The secondary chamber includes a second vacuum compartment and a second variable pressure compartment wherein the second vacuum compartment and the second variable pressure compartment are separated by a second diaphragm. It is desirable to provide a continuously open communication route between the first and the second variable pressure compartments.

In the optional twin diaphragm arrangement, a shaft extends through the opening in the housing divider wall. A tube is disposed about a portion of the shaft and has a first end secured in the opening in the housing divider wall and a second end positioned near the rear housing section so that the tube extends through the primary chamber penetrating the first diaphragm. The tube includes at least one opening near its second end, and its first end includes a radially directed wall that extends to an axially extending wall positioned concentrically with the tube. The axially extending wall is positioned within the opening in the housing divider wall with a seal positioned between the axially extending wall and the housing divider wall. The first and the second variable pressure chambers are advantageously open to one another through the tube, and the distance between the front housing section and the rear housing section is minimized.

Optionally, the present invention may include a second end of the tube that is formed with a reduced cross section so that a flex zone is provided by the tube near the contact point between the tube and the rear housing section. This advantageously allows the length of the tube to adapt to the amount of free room, eliminating the need to provide clearance space which would undesirably add length to the power booster.

BRIEF DESCRIPTION OF THE DRAWINGS

The present invention will now be described, by way of example, with reference to the accompanying drawings, in which.

DETAILED DESCRIPTION OF THE PRESENTLY PREFERRED EMBODIMENT

The present invention is concerned with power boosters and is described in detail with reference to embodiments of power boosters with penetrating shafts that help support the power booster housing. The invention is also applicable to other situations without penetrating shafts such as when a subsidiary component of the power booster requires a passage through a diaphragm, its support wall, or a divider wall. Accordingly, the present description is only exemplary of the invention, which can be applied in a myriad of applications.

Figure 1:
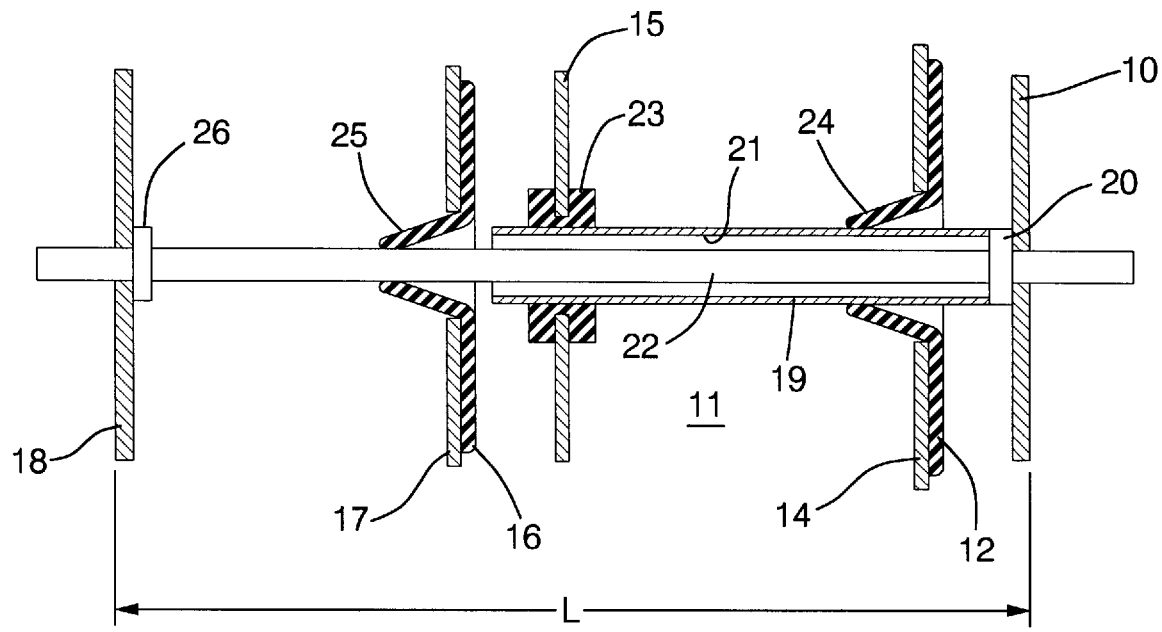
FIG. 1 is a schematic drawing of a power booster penetrating shaft seal area.

Referring to FIG. 1, the significance of the present invention is demonstrated. A power booster's rear housing section 10 encloses a cavity 11 that contains a diaphragm 12 and its accompanying support wall 14. A housing divider wall 15 is positioned on the opposite side of the diaphragm 12 from the rear housing wall 10. A second diaphragm 16 and accompanying support wall 17 are positioned between the housing divider wall 15 and the front housing wall 18. A tube 19 extends through the housing divider wall 15, the diaphragm 12 and its support wall 14 and includes an end 20 that is engaged near the rear housing wall 10. The tube 19 provides an opening 21 through the diaphragm 12 and housing divider wall 15. A shaft 22 extends between the front housing wall 18 and the rear housing wall 10, and passes through the tube 19.

The seal 23 is an axial length increasing component consuming several millimeters in the power booster's axial length L. This is demonstrated by the equation:

$$L \geq T+SL+SE-I+\epsilon+K$$

where:

T is travel length required by the movable support walls 14 and 17, and their diaphragms 12 and 16, SL is the length of the sleeves 24 and 25, SE is the sealing system dimension, the axial length of seal 23, I is the interference that the sleeves 24 and 25 allow by being compressible, $\epsilon$ is the supplementary length required when tolerances and minimal functional clearances are taken into account, and K is the total thickness of the internal parts including walls 10 and 18, flange 26 walls 14 and 17 and diaphragms 12 and 16.

Removing the axial length of the seal 23 from the equation results in a minimal length l wherein:

$$l \geq T+SL+E-I+\epsilon+K$$

where:

E is the thickness of the separating wall 15.

Accordingly, it follows that: l<L by the amount that E<SE, and the axial length of the power booster can be minimized by removing the axial space consuming trait from the seal 23. To enable inclusion of the seal and to minimize axial length, the following embodiments are provided.

Figure 2:
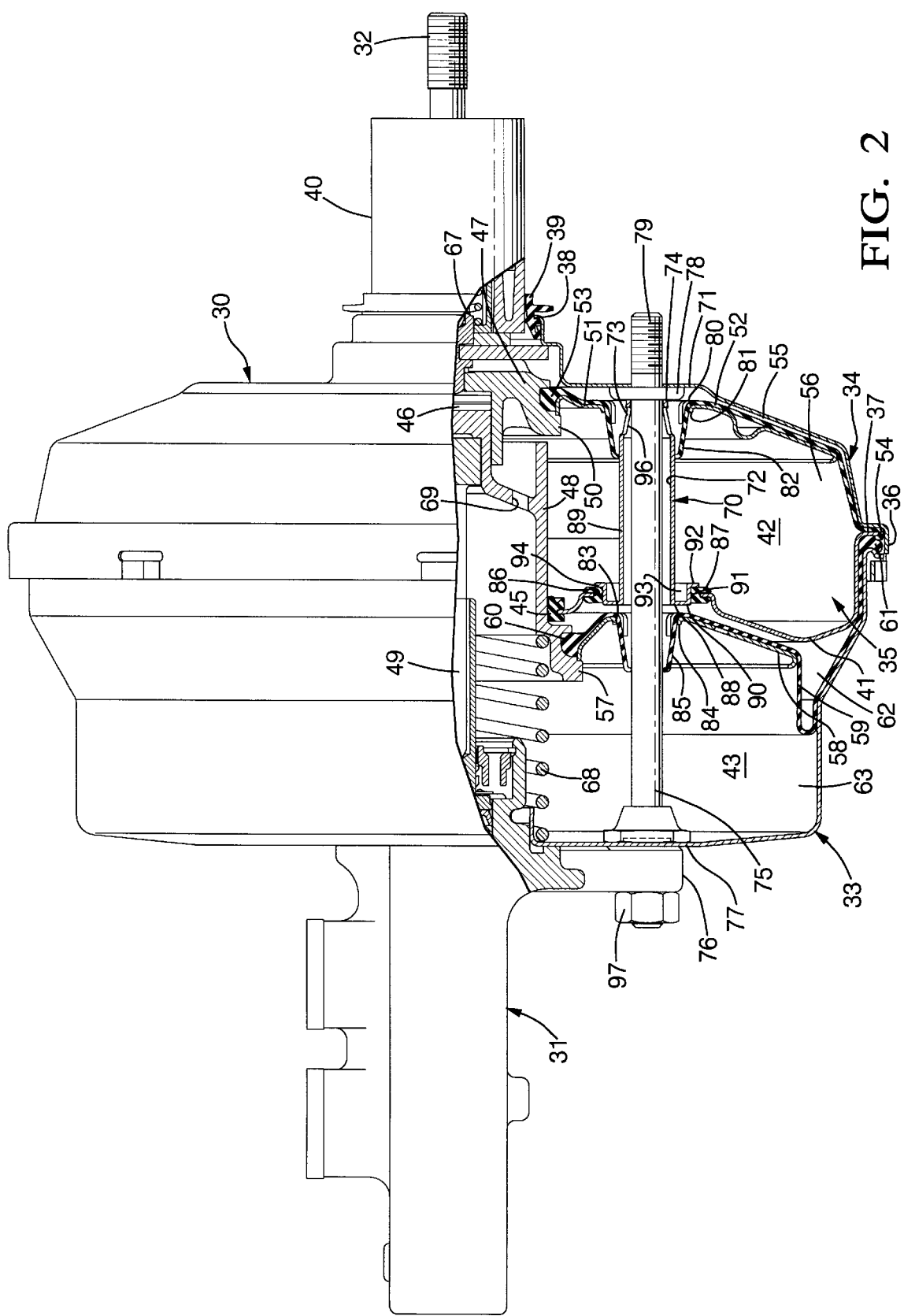
FIG. 2 is a fragmentary cross sectional illustration of a power booster according to the present invention.

Referring to FIG. 2, power booster 30 is illustrated. The power booster 30 supports a master cylinder 31, which is commonly known in the art, and includes a push rod 32 that actuates the power booster 30 through a brake pedal (not illustrated). Power booster 30 is a dual diaphragm vacuum operated power booster in this exemplary embodiment. Power booster 30 has a substantially open internal cavity 35 which is formed by mating front housing section 33 and rear housing section 34. The front and rear housing sections 33 and 34 are formed from a conventional lightweight material such as metal or plastic. Rear housing section 34 includes an axially extending flange 36. Axially extending flange 36 mates with outer turned flange 37 of front housing section 33 locking the housing sections 33, 34 together. An inner edge 38 of rear housing section 34 carries a seal 39. The end of rear housing section 34 is enclosed by boot 40 which is received by the seal 39.

A housing divider wall 41 separates the internal cavity 35 into primary and secondary chambers 42 and 43, respectively. Housing divider wall 41 includes an outer peripheral flange which is engaged between the front housing section 33 and rear housing section 34. Housing divider wall 41 also includes an inner edge 44 that carries an annular seal 45. A piston 48 extends through annular seal 45. The piston 48 is slidable forwardly and rearwardly to actuate the master cylinder 31 through the output rod 49. The annual seal 45 acts as a bearing for supporting the piston 48 in the lateral direction.

Piston 48 is mechanically linked to a power piston 47 through a rubber reaction disk 46. This power piston 47 includes an annular wall 50, against which support wall 51 supports diaphragm 52. Diaphragm 52 includes an integral inner annular seal 53 which engages the power piston 47 and an integral outer annular seal 54 that engages housing divider wall 41 and the housing. Diaphragm 52 separates primary chamber 42 into variable pressure compartment 55 and vacuum compartment 56. Piston 48 includes annular wall 57 against which support wall 58 supports diaphragm 59. Diaphragm 59 includes an integral inner annular seal 60 which engages the piston 48 and an integral outer annular seal 61 that engages the housing divider wall 41 and the housing. Diaphragm 59 separates secondary chamber 43 into variable pressure compartment 62 and vacuum compartment 63.

The diaphragms 52 and 59, and their respective support walls 51 and 58, are operable such that a vacuum pressure exists in vacuum compartments 56 and 63 which is generated therein by engine intake vacuum or by a supplementary source. A variable pressure exists in variable pressure compartments 55 and 62 for selectively moving power piston 47 and piston 48 forward in response to pressure differentials created by the introduction of atmospheric air through air valve 67. The variable pressure in variable pressure compartments 55 and 62 selectively creates a force on the respective diaphragms 52 and 59. The support walls 51 and 58 apply the force of the diaphragms 52, 59 to the respective annular walls 50 and 57 of power piston 47 and piston 48. In response, piston 48 compresses return spring 68, causing piston 48 to slide within annular seal 45 and power piston 47 to slide within seal 39, forcing output rod 49 to apply force to the master cylinder 31.

The variable pressure in variable pressure compartments 55 and 62 is increased through operation of the air valve 67. Air valve 67 selectively allows atmospheric pressure to enter the compartments 55 and 62 under operation of the pushrod 32 and thus creates a pressure differential across the diaphragms 52 and 59. The maximum pressure differential between the variable pressure compartments 55 and 62 on one hand, and vacuum compartments 56 and 63 on the other hand, is generally the difference between the vacuum source and atmospheric pressure.

Atmospheric air entering the power booster 30 travels through the air valve 67 and the vacuum drawn from the power booster 30 exits through a vacuum check valve (not illustrated), which is received in the front housing section 33 in communication with vacuum chamber 63. Piston 48 includes an air passage 69 through which the vacuum effect is transferred from vacuum chamber 63 to vacuum chamber 56. A tube 70 is provided that extends from the housing divider wall 41 to near the rear wall 71 of rear housing section 34 where it is grounded to the housing. The tube 70 provides an opening 72 that extends through housing divider wall 41, diaphragm 52 and support wall 51. A series of side openings 73 are provided in tube 70 near tapered end 74 that register with the variable pressure compartment 55 so that the tube 70 provides the air flow path for atmospheric air entering the variable pressure compartment 62 from the variable pressure compartment 55. The tapered end 74 locates the tube 70 about a shaft 75. Advantageously, it is not compulsory to locate the tube 70 concentrically with the shaft 75, which can be offset or oblique relative to the tube 70.

Shaft 75 extends through the power booster 30 and a flange 76 of master cylinder 31. The shaft 75 is fixed to the master cylinder 31 capturing the front wall 77 of front housing section 33 against the flange 76, and is held in place by a nut 97. The rear wall 71 is positioned by a flange 78 fixed in position on the shaft 75 and a segment 79 is provided for attachment to a vehicle's mounting structure (not illustrated). The shaft 75 extends through diaphragm 59 and its support wall 58, housing divider 41, and diaphragm 52 and its support wall 51. The support wall 51 includes an opening 80 with a forward turned lip 81, through which the shaft 75 extends. The diaphragm 52 includes an integral flexible sleeve 82 that extends through the opening 80 and engages tube 70, sealing thereagainst. Similarly, the support wall 58 includes an opening 83 with a forward turned lip 84, through which the shaft 75 extends. The diaphragm 59 includes an integral flexible sleeve 85 that extends through the opening 83 and engages shaft 75, sealing thereagainst. During operation of the power booster 30, the sleeve 82 slides along the tube 70 as the diaphragm 52 and its support wall 51 move. Additionally, the sleeve 85 slides along the shaft 75 as the diaphragm 59 and its support wall 58 move.

Figure 3:
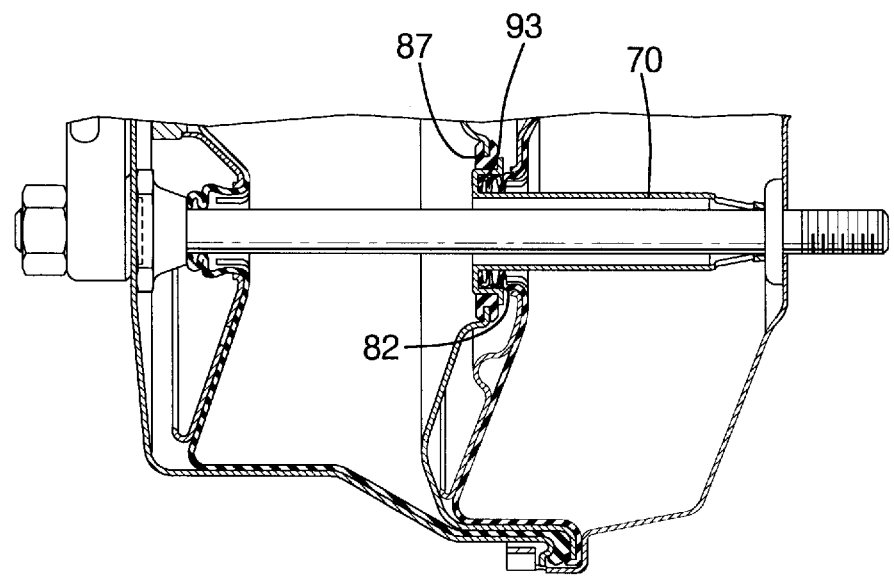
FIG. 3 is a partial illustration of the power booster of FIG. 2 shown in an actuated condition.

The housing divider wall 41 includes an opening 86 that carries a seal 87. The seal 87 is of an annular dual lip construction. The tube 70 includes an end 88 that is secured in the opening 86 engaging the dual lips of the seal 87. From the main cylindrical body 89 of the tube 70, a radially directed wall 90 extends to an axially extending wall 91 that is concentrically positioned about main cylindrical body 89. The axially extending wall 91 includes a radially outwardly turned lip 92, and the seal 87 engages the tube 70 at axially extending wall 91. The axially extending wall 91 is projected radially outside the sleeve 82 so that during maximum travel of the diaphragm 52 and its support wall 51, the sleeve 82 is received within annular pocket 93 maximizing travel and therefore, minimizing the overall axial length of the power booster 30. As shown in FIG. 3, receipt of the sleeve 82 within pocket 93 substantially offsets any additional axial length of the seal 87 in the overall axial length of the power booster 30.

During operation of the power booster 30, the housing divider wall is subjected to a pressure differential between its side in variable pressure compartment 62 and its side in vacuum compartment 56. At maximum, the pressure differential is equal to the difference between the vacuum source and the atmospheric pressure. In application, this pressure differential may deflect the housing divider wall 41 an appreciable amount. Due to a range of tolerances in manufactured components, a clearance is optionally provided in the space 94 between the seal 87 and the outwardly turned lip 92. This is because the force effecting housing divider wall movement caused by the pressure differential may damage the tube 70 if restrained. In the present embodiment, this clearance is omitted and does not take into account movement of the housing divider wall 41, with the housing divider wall 41 grounded against outwardly turned lip 92 which acts as a relative stop. To accommodate movement of the housing divider wall 41, the tube 70 includes a spring effect, wherein the tapered section 96 is elastically deformable and flexes to avoid the build-up of undue stresses. For example, the adaptation of the tapered section 96 by formation of the openings 73 allows the length of the tube 70 to adapt to the movement of the housing divider wall 41 toward the rear wall 71 as permitted by flexure of the reduced cross sectional area of the tube 70 at the openings 73. To facilitate this effect, the tube 70 is preferably made of a thermoplastic material.

Figure 4:
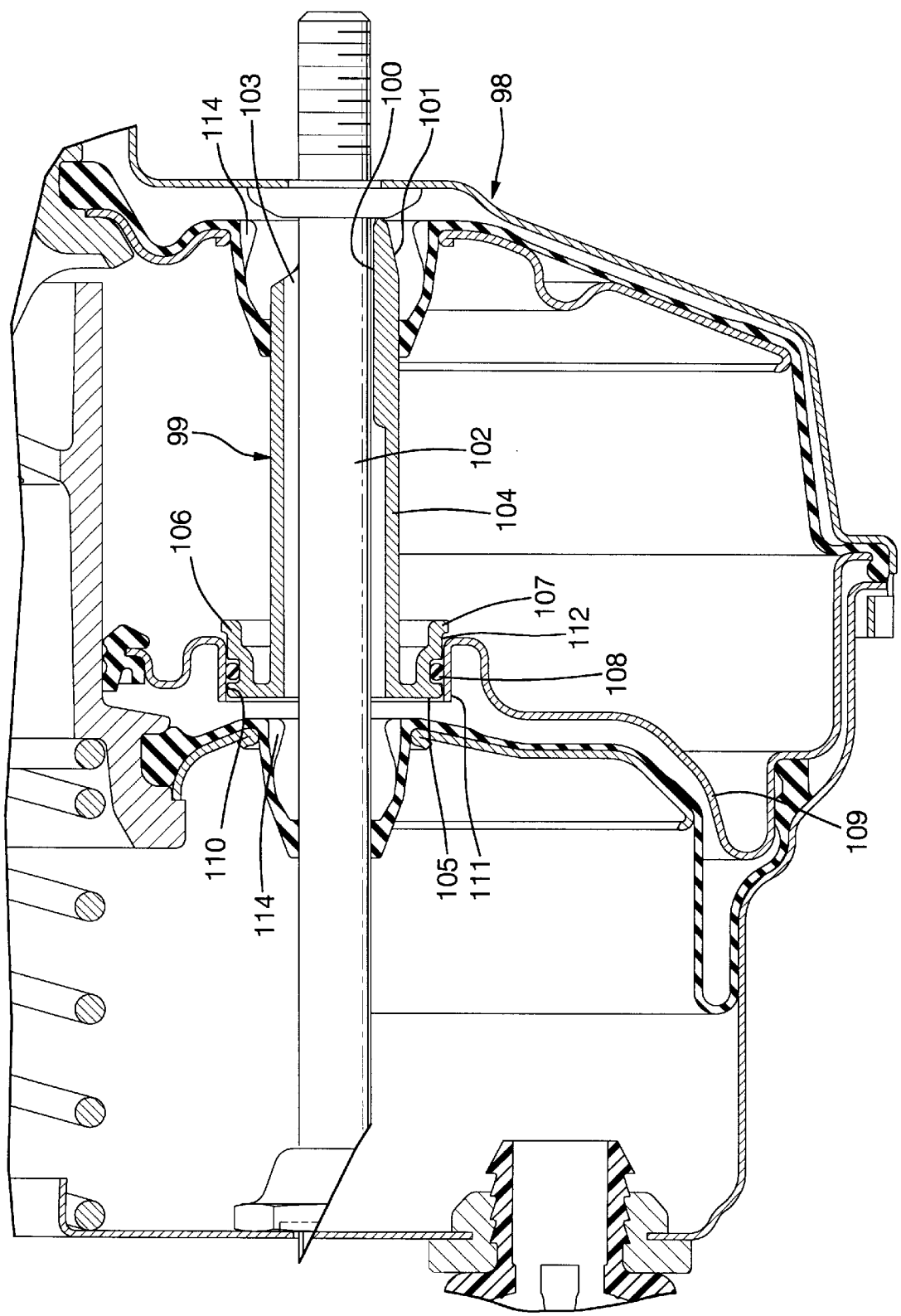
FIG. 4 is a cross sectional illustration of a power booster according to the present invention.

Referring to FIG. 4, an alternative embodiment of the present invention is illustrated. The power booster 98 is similar to the power booster 30 of FIG. 2. In the power booster 98, the tube 99 includes an internal rib 100 near tapered end 101 that advantageously serves to locate the tube 99 on the shaft 102 in a substantially centered position. A notch 103 forms an opening to the interior of tube 99. The tube 99 also includes a main cylindrical body 104, and a radially directed wall 105 that extends to an axially extending wall 106 that is concentrically positioned about main cylindrical body 104. The axially extending wall 106 includes a radially outwardly turned lip 107. An annular groove 108 is formed around the axially extending wall 106. The housing divider wall 109 includes an opening 110 formed by forwardly turned annular wall 111. The forwardly tuned annular wall 111 is disposed about the axially extending wall 106 and its length covers a majority of the length of axially extending wall 106. A seal is carried in the annular groove 108 and bears against the forwardly turned annular wall 111 and axially extending wall 106. A clearance 112 is provided between the housing divider wall 109 and the outwardly turned lip 107 for axial movement caused by the variable pressure differentials across the housing divider wall 109. Additionally, a set of four ribs 114 are integrally formed by the diaphragms at the sleeves that engage tube 99.

In accordance with the present invention, a power booster sealing mechanism is provided that enables minimizing the overall axial length. In addition to saving space, the sealing mechanism is manufactured and assembled with relative ease.

What is claimed is:

1. A power booster comprising:

a housing with a rear housing section and a front housing section defining an internal cavity;

a housing wall separating the internal cavity into a first area and a second area with an opening formed in the housing wall, wherein it is desirable to extend a component through the opening;

a diaphragm positioned in the cavity wherein the diaphragm includes a sleeve that is formed as one piece with the diaphragm;

a tube having a body with an end secured in the opening in the housing wall wherein the end includes a radially directed wall extending from the end of the tube wherein the radially extending wall extends to an axially extending wall positioned generally concentrically with the body, wherein the axially extending wall is positioned within the opening in the housing wall with a seal positioned between the axially extending wall and the housing wall wherein the distance between the front housing section and the rear housing section is minimized at an axis extending through the component;

wherein the sleeve sealingly engages the tube and is slidable along the tube with movement of the diaphragm; wherein when the power booster is actuated, the sleeve is slidable to a position between the body and the axially extending wall of the tube.

2. A power booster according to claim 1 wherein the tube includes a tapered end that is positioned near the rear housing section with at least one side opening near the tapered end so that the first area is open to the second area through the side opening and the tube.

3. A power booster according to claim 2 wherein the tube includes an outwardly turned lip extending form the axially extending wall that acts as a stop between the housing wall and the tube.

4. A power booster according to claim 3 wherein the housing wall applies force to the tube during actuation of the power booster and wherein in response, the tube flexes near the tapered end.

5. A power booster according to claim 4 wherein the housing wall carries said seal in the opening that engages the axially extending wall of the tube.

6. A power booster according to claim 4 wherein the housing wall includes a turned annular wall that is disposed about the axially extending wall of the tube with said seal disposed between the axially extending wall and the turned annular wall.

7. A power booster according to claim 6 wherein the axially extending wall includes an annular groove that receives the annular seal.

8. A power booster with a sealing mechanism comprising:

a housing with a rear housing section and a front housing section defining an internal cavity;

a housing divider separating the internal cavity into a primary chamber and a secondary chamber with an opening formed in the housing divider wherein the primary chamber includes a first vacuum compartment and a first variable pressure compartment wherein the first vacuum compartment and the first variable pressure compartment are separated by a first diaphragm wherein the secondary chamber includes a second vacuum compartment and a second variable pressure compartment wherein the second vacuum compartment and the second variable pressure compartment are separated by a second diaphragm and wherein it is desirable to provide a continuously open communication route between the first and the second variable pressure compartments;

wherein the first diaphragm includes a first sleeve that is formed as one piece with the first diaphragm;

a shaft extending through the opening in the housing divider;

a tube including a cylindrical body and extending axially and disposed about a portion of the shaft the tube having a first end secured in the opening in the housing divider and a second end positioned near the rear housing section so that the tube extends through the primary chamber penetrating the first diaphragm, wherein the tube includes at least one opening near the second end and wherein the first end includes a radially directed wall extending from the first end of the tube wherein the radially extending wall extends to an axially extending wall positioned concentrically with the cylindrical body wherein the axially extending wall is positioned within the opening in the housing divider with a seal positioned between the axially extending wall and the housing divider wherein the first and the second variable pressure chambers are open to one another through the tube and wherein distance between the front housing section and the rear housing section along the shaft is minimized;

wherein the first sleeve sealingly engages the tube and is slidable along the tube with movement of the first diaphragm; wherein when the power booster is actuated, the first sleeve is slidable to a position between the body and the axially extending wall of the tube.

9. A power booster according to claim 8 wherein the second end is tapered and locates the tube about the shaft.

10. A power booster according to claim 9 wherein the tube includes an outwardly turned lip extending form the axially extending wall that acts as a stop between the housing divider and the tube.

11. A power booster according to claim 10 wherein the housing divider applies force to the tube during actuation of the power booster and wherein in response, the tube flexes near the second end.

12. A power booster according to claim 11 wherein the housing divider carries said seal in the opening that engages the axially extending wall of the tube.

13. A power booster according to claim 11 wherein the housing divider includes a turned annular wall that is disposed about the axially extending wall of the tube with said seal disposed between the axially extending wall and the turned annular wall.

14. A power booster according to claim 13 wherein the axially extending wall includes an annular groove that receives the annular seal.

15. A power booster with a sealing mechanism comprising:

a housing with a rear housing section and a front housing section defining an internal cavity;

a housing divider separating the internal cavity into a primary chamber and a secondary chamber with an opening formed in the housing divider wherein the primary chamber includes a first vacuum compartment and a first variable pressure compartment wherein the first vacuum compartment and the first variable pressure compartment are separated by a first diaphragm with a first sleeve, wherein the secondary chamber includes a second vacuum compartment and a second variable pressure compartment wherein the second vacuum compartment and the second variable pressure compartment are separated by a second diaphragm with a second sleeve, and wherein it is desirable to provide a continuously open communication route between the first and the second variable pressure compartments;

a shaft extending through the opening in the housing divider wherein the second sleeve of the second diaphragm sealingly engages the shaft and is slidable along the shaft;

a tube including a cylindrical body extending axially and being disposed about a portion of the shaft, the tube having a first end secured in the opening in the housing divider and a second end positioned near the rear housing section so that the tube extends through the primary chamber penetrating the first diaphragm, wherein the tube includes at least one opening near the second end and wherein the first end includes a radially directed wall extending from the first end of the tube wherein the radially extending wall extends to an axially extending wall positioned concentrically with the tube wherein the axially extending wall is positioned within the opening in the housing divider with a seal positioned between the axially extending wall and the housing divider, wherein the first sleeve of the first diaphragm sealing engages the cylindrical body of the tube and is slidable along the cylindrical body, so that when the power booster is actuated, the first sleeve is slidable to a position between the body and the axially extending wall of the tube so that the seal is positioned radially outwardly from the first sleeve, wherein the first and the second variable pressure chambers are open to one another through the tube and wherein the distance between the front housing section and the rear housing section along the shaft is minimized.

16. A power booster according to claim 15 wherein the housing divider applies force to the tube during actuation of the power booster and wherein in response, the tube flexes at the second end.

* * * * *